(12) United States Patent
Izumita et al.

(10) Patent No.: US 8,196,011 B2
(45) Date of Patent: Jun. 5, 2012

(54) ERROR DETECTION AND CORRECTION CIRCUIT AND SEMICONDUCTOR MEMORY

(75) Inventors: Morishi Izumita, Inagi (JP); Hiroshi Takayanagi, Hidaka (JP)

(73) Assignee: Hitachi ULSI Systems Co., Ltd., Tokyo (JP)

( * ) Notice: Subject to any disclaimer, the term of this patent is extended or adjusted under 35 U.S.C. 154(b) by 961 days.

(21) Appl. No.: 12/279,177

(22) PCT Filed: Feb. 15, 2006

(86) PCT No.: PCT/JP2006/302616
§ 371 (c)(1),
(2), (4) Date: Aug. 12, 2008

(87) PCT Pub. No.: WO2007/094055
PCT Pub. Date: Aug. 23, 2007

(65) Prior Publication Data
US 2008/0320368 A1 Dec. 25, 2008

(51) Int. Cl.
*G06F 3/00* (2006.01)

(52) U.S. Cl. ........ 714/758; 714/746; 714/752; 714/753; 714/755; 714/756; 714/763; 714/767; 714/768; 714/769; 714/773; 714/781; 714/784; 714/799; 714/800; 714/801; 714/807; 714/808

(58) Field of Classification Search ............... None
See application file for complete search history.

(56) References Cited

U.S. PATENT DOCUMENTS

| | | | |
|---|---|---|---|
| 4,464,753 A * | 8/1984 | Chen | 714/765 |
| 4,882,638 A * | 11/1989 | Onishi et al. | 360/32 |
| 6,504,493 B1 * | 1/2003 | Burd | 341/50 |
| 6,615,387 B1 * | 9/2003 | Williamson et al. | 714/785 |
| 6,747,580 B1 * | 6/2004 | Schmidt | 341/50 |
| 7,203,890 B1 * | 4/2007 | Normoyle | 714/768 |

(Continued)

FOREIGN PATENT DOCUMENTS

JP 62-172571 A 7/1987

(Continued)

OTHER PUBLICATIONS

Chikasi Horikiri "No Time to Waste for Soft Error Countermeasures, SRAM and Logic Circuit Now Come Under Scrutiny", Nikkei Electronics, Nikkei Business Publication, Inc., Jul. 4, 2005, No. 903, pp. 63-70.

(Continued)

*Primary Examiner* — John Trimmings
(74) *Attorney, Agent, or Firm* — Miles & Stockbridge P.C.

(57) ABSTRACT

Input data (1A) having an integral multiple of 8 bits is divided into symbols in units of b bits (b is an integer of 5 to 7) in a register file 10, an error detecting code is added in an error detection calculation circuit 20, and then encoding (such as Reed Solomon (RS) encoding) having an error correction capability of two or more symbols is performed in a parity calculation circuit 30 to record the data in a storage 40. In the reproduction, error correction in units of symbols is performed to reproduced data from the storage 40 in an error correction circuit 70, error detection processing is performed in an error detection calculation circuit 80, and then data having the integral multiple of 8 bits is recovered in a register file 90 to output the same. By this means, it is possible to provide a storage system with high reliability to a soft error that occurs in a storage such as semiconductor memory.

13 Claims, 6 Drawing Sheets

U.S. PATENT DOCUMENTS 7,665,007 B2 * 2/2010 Yang et al. .................... 714/755
2005/0028061 A1 * 2/2005 Nicolaidis ..................... 714/736

FOREIGN PATENT DOCUMENTS

| JP | 08-008760 A | 1/1996 |
| JP | 10-340586 A | 12/1998 |
| JP | 2003-337760 A | 11/2003 |
| JP | 2005-176244 A | 6/2005 |

OTHER PUBLICATIONS

Yoshiharu Tosaka, "Reality of Soft Error You Need to Know: History, Evaluation Method and Countermeasures", Nikkei Electronics, Nikkei Business Publication, Inc., Jul. 4, 2005, No. 903, pp. 145-156.

\* cited by examiner

FIG. 1

| Base (b) bit | MAXIMUM CODE LENGTH bit symbol | CODE LENGTH (n) bit | INFORMATION POINT (k) bit ($2^x$) | CHECK POINT (h) bit symbol | OVERHEAD BIT bit | REDUNDANCY (h/n) (%) |
|---|---|---|---|---|---|---|
| 5 | 155 32-1 | 150 | 128 ($2^7$) | 20 4 | 2 | 14.7% |
| 6 | 378 64-1 | 282 | 256 ($2^8$) | 24 4 | 2 | 9.2% |
| 7 | 889 128-1 | 546 | 512 ($2^9$) | 28 4 | 6 | 6.2% |
| 8 | 2040 256-1 | 1056 | 1024 ($2^{10}$) | 32 4 | 0 | 3.0% |

ERROR DETECTION AND CORRECTION CIRCUIT AND SEMICONDUCTOR MEMORY

TECHNICAL FIELD

The present invention relates to an error detection and correction technology, and more particularly to a technology effectively applied to a configuration of an error detection and correction circuit used to enhance data reliability in a system in which data is recorded to and reproduced from a storage medium (for example, semiconductor memory).

BACKGROUND ART

The error detection and correction technologies examined by the inventors of the present invention include the following technologies.

In recent years, with the trend to higher integration (miniaturization) and lower voltage in a semiconductor integrated circuit, the influence due to the occurrence of soft error has become a serious problem. The soft error mentioned here is a phenomenon in which recorded information is inverted by α ray or neutron.

As the measures against the soft error, utilization of an error correcting code such as ECC (Error Check and Correct) has been known. In particular, Patent document 1, Patent document 2 and others describe that means such as ECC is mounted on a semiconductor integrated circuit in order to improve soft error tolerance in DRAM, SRAM and system LSI. In such a system, a bit error correcting code has been generally used and an extended hamming code (SEC-DED code (Single Error Correcting-Double Error Detecting Code)) is mainly used at present. This code corrects a 1-bit error and detects a 2-bit error. Conventionally, 8-bit error correction data (parity) is added for each 64-bit data and the data is stored and reproduced in units of 72-bit data in total, and the code is called (72, 64) SEC-DED code.

Figure 6:
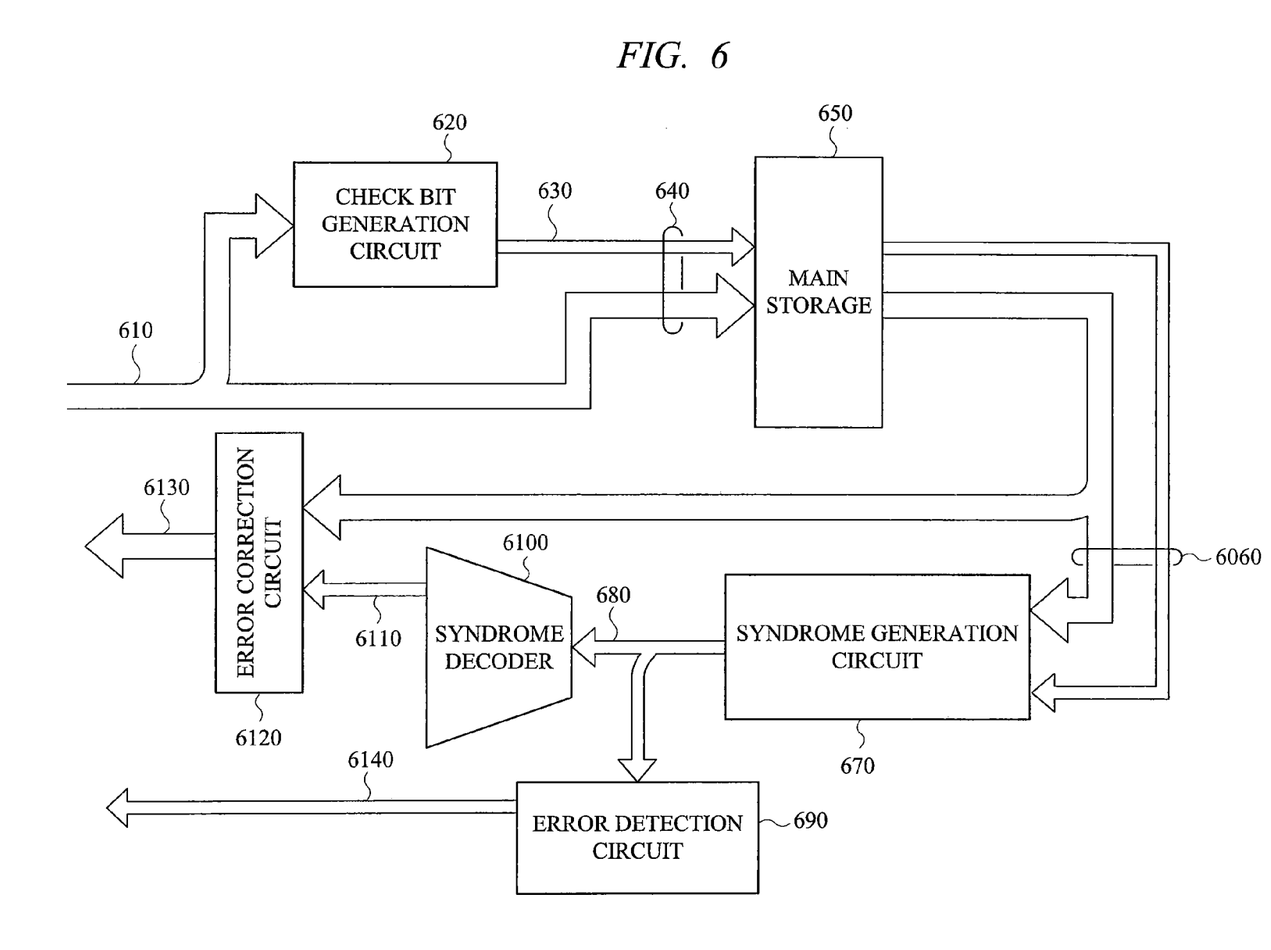
FIG. 6 is a block diagram showing a configuration of an error detection and correction circuit according to a conventional technology.

However, since the soft error due to α ray ranges over multiple bits, multi-bit errors need to be handled and a code that performs the detection in units of b (b=4) bits is proposed. FIG. 6 is a block diagram of the error detection and correction system, in which 610 denotes encoded information, 620 denotes a check bit generation circuit, 650 denotes a main storage, 670 denotes a syndrome generation circuit, 690 denotes an error detection circuit, 6100 denotes a syndrome decoder, and 6120 denotes an error correction circuit. This system has a capability to detect a single block error of b (b=4) bits and is capable of 1-bit error correction and 2-bit error detection.

Furthermore, Patent document 3 proposes a configuring method and decoding method of a code called spotty byte error control code. This relates to a code and its decoding circuit for correcting a single spotty byte error and detecting two spotty byte errors. The spotty byte error mentioned here is the error up to t bits within one byte consisting of b bits ($t \leq b$).

Patent document 1: Japanese Patent Application Laid-Open Publication No. 10-340586
Patent document 2: Japanese Patent Application Laid-Open Publication No. 2003-337760
Patent document 3: Japanese Patent Application Laid-Open Publication No. 2005-176244
Non-Patent document 1: Chikasi HORIKIRI, "No Time to Waste for Soft Error Countermeasures, SRAM and Logic Circuit Now Come under Scrutiny", Nikkei Electronics, Nikkei Business Publication, Inc., Jul. 4, 2005, No. 903, pp. 63-70
Non-Patent document 2: Yoshiharu TOSAKA, "Reality of Soft Error You Need to Know: History, Evaluation Method and Countermeasures", Nikkei Electronics, Nikkei Business Publication, Inc., Jul. 4, 2005, No. 903, pp. 145-156

DISCLOSURE OF THE INVENTION

Problem to be Solved by the Invention

Incidentally, as a result of the examination by the inventors of the present invention on the error detection and correction technologies described above, the following has been revealed.

For example, it has been revealed that, on the occurrence of a soft error, in particular, soft error due to neutron, an error ranging over 2 bits or more or possibly over 7 bits or more may occur (see Non-Patent document 1 and Non-Patent document 2). The conventional code can never handle such a soft error. Even though a 1-bit error correcting and 2-bit error detecting code, a single spotty byte error correcting and double spotty bite error detecting code or others can detect the occurrence of 2-bit (or double spotty byte) error as is conventional, it is difficult to handle the same in a system.

Also, although a method of interleaving (mixing) these codes may be considered in order to handle consecutive soft errors, there arises a problem that a degree of redundancy increases.

Therefore, an object of the present invention is to provide a technology capable of detecting and correcting errors even on the occurrence of errors ranging over multiple bits.

The above and other objects and novel characteristics of the present invention will be apparent from the description of this specification and the accompanying drawings.

Means for Solving the Problems

The typical ones of the inventions disclosed in this application will be briefly described as follows.

More specifically, in the error detection and correction circuit according to the present invention, input data having an integral multiple of 8 bits is divided into symbols in units of b bits (b is an integer of 5 to 7), and after adding an error detecting code to the data in second encoding means, encoding (for example, Reed Solomon (RS) encoding) having an error correction capability of two or more symbols is performed to the data in first encoding means to record the data in a storage. Further, when reproducing, error correction in units of symbols is performed to reproduced data from the storage in decoding means and error detection processing is then performed, and then, the data is outputted after being decoded to the data having the integral multiple of 8 bits.

Furthermore, a semiconductor memory according to the present invention incorporates the error detection and correction circuit therein.

Effect of the Invention

The effects obtained by typical aspects of the present invention will be briefly described below.

It is possible to provide a storage system with high reliability for a soft error that occurs in a storage such as a semiconductor memory.

BEST MODE FOR CARRYING OUT THE INVENTION

Hereinafter, embodiments of the present invention will be described in detail with reference to the accompanying drawings. Note that components having the same function are denoted by the same reference numbers throughout the drawings for describing the embodiments, and the repetitive description thereof will be omitted.

First, an error detection and correction method in an error detection and correction circuit according to an embodiment of the present invention will be described.

In the error detection and correction circuit according to the present embodiment, input data having an integral multiple of 8 bits is divided into units of b bits (b is an integer of 5 to 7 and the unit is referred to as symbol) to be processed. Then, an error detecting code of a bit unit is added to extra (redundant) bits generated in the division, and a code having a 2-symbol error correction capability is added to the data and then the data is recorded in a storage. Further, the error detection and correction circuit is characterized by performing 2-symbol error detection and correction to the data reproduced from the storage in a reproducing operation, and then performing error detection in units of bits. The error detecting code of a bit unit may be a simple parity check code, a cyclic redundancy check code (CRCC) or the like though it depends on the number of bits usable as redundant bits.

Also, the Reed Solomon code (RS code) is generally used as the symbol error correcting code, but the symbol error correcting code is not limited thereto and may be an extensive (extended) RS code, an algebraic geometry code or the like.

Hereinafter, an example of RS code will be described below, in which a code length n is defined as n=q−1, and q is an original number.

A check point h, an information point k and a code length n (symbol) have the following relationship (Equation 1).

$$n-k=h \quad \text{(Equation 1)}$$

When $\alpha$ is the primitive (q−1)-th root of 1, the code of GF(q) having $\alpha, \alpha^1, \alpha^2, \alpha^3$ as a root has the minimum distance of dmin=h+1=5 to be the RS code having a 2-symbol error correction capability.

The Reed Solomon encoding circuit and decoding circuit are well-known to those skilled in the art and detailed description thereof will be omitted, but they are described in Japanese Patent Application Laid-Open Publication No. 2001-244821, Japanese Patent Application Laid-Open Publication No. 5-298131 and others.

The encoding is performed by multiplying the input data by a generator matrix $G(\alpha)$.

In the decoding, reproduced data is multiplied by a check matrix $H(\alpha)$ to calculate four vectors (S0, S1, S2, S3) called syndrome. If no error has occurred, all the four syndromes are zero.

It is now assumed that two errors occur, the error positions are i and j, and the magnitudes of the errors are Ei and Ej, respectively. Since the positions and magnitudes of the errors can be calculated from the relational expression of the syndrome, the errors can be corrected.

By applying such a correcting code of a symbol unit, any error that occurs at any position in a block can be completely corrected if the error is two symbols (2b bits) or smaller.

Next, the number of bits and the code length of a symbol will be briefly described.

Figure 1:
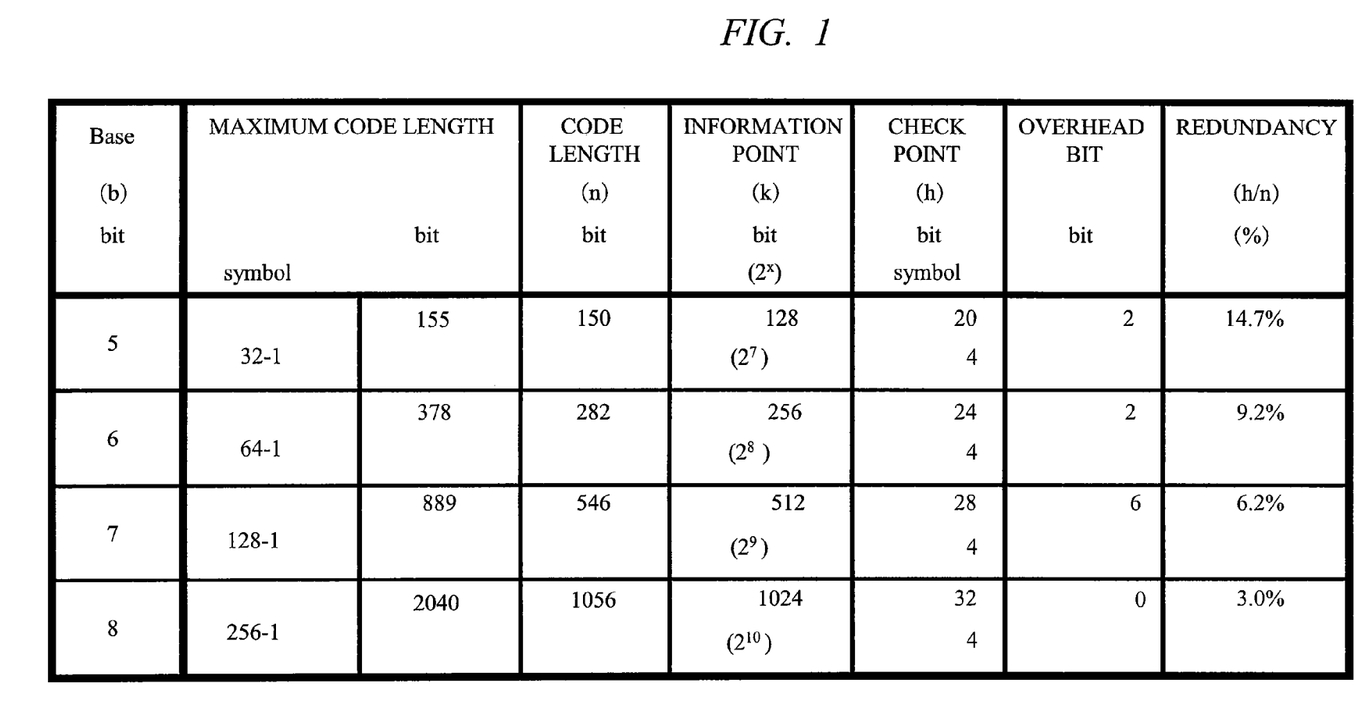
FIG. 1 is a diagram showing a bit configuration of a reduced 2-symbol correcting code in an error detection and correction circuit according to an embodiment of the present invention.

FIG. 1 is a table showing a relationship among the number of bits in a reduced 2-symbol error correcting code (b), the maximum code length, the reduced code length (n), an information point (k), a check point (h), an overhead bit and a degree of redundancy in the error detection and correction method according to the embodiment. In FIG. 1, Base denotes the number of bits in one symbol (b). Furthermore, each unit is represented by the number of symbols (symbol), the number of bits (bit) and percentage (%).

For example, when the number of bits in one symbol is 5 bits and the information point (k) is 128 bits, the check point (h) is 20 bits (4 symbols) and the code length is 148 bits in total. In this case, since the code length is not multiple of 5 bits, extra overhead bits of 2 bits are added to give 150 bits for processing.

The present embodiment is characterized in that an error detecting code is used as the overhead bit for input data. As the error detecting code, for example, two simple parities interleaved for each bit may be used as shown in (Equation 2) and (Equation 3).

$$P1 = \sum_{n=0}^{63} EXOR(D(2n)) \quad \text{(Equation 2)}$$

$$P2 = \sum_{n=0}^{63} EXOR(D(2n+1)) \quad \text{(Equation 3)}$$

In (Equation 2) and (Equation 3), the data ranges from D(0) to D(127) and EXOR means the Exclusive OR operation.

Similarly, when the number of bits in one symbol (b) is 6 bits and the information point (k) is 256 bits, the check point (h) is 24 bits (4 symbols) and the code length is 280 bits in total. Also in this case, the 2 bits to be the overhead bits are used for the error detecting code.

Furthermore, when the number of bits in one symbol (b) is 7 bits and the information point (k) is 512 bits, the check point (h) is 28 bits (4 symbols) and the code length is 540 bits in total. In this case, 6 bits are used for the error detecting code. It is effective to use the CRCC as the 6-bit error detecting code because the possibility of missing an error is further reduced.

As described above, by increasing the number of bits in a symbol to extend the code length, the degree of redundancy can be reduced. However, since the number of operation circuits for encoding and decoding and the number of bits to be processed at one time are increased and the number of wirings for address is increased, the excessive extension of the code length is not always preferable.

Figure 2:
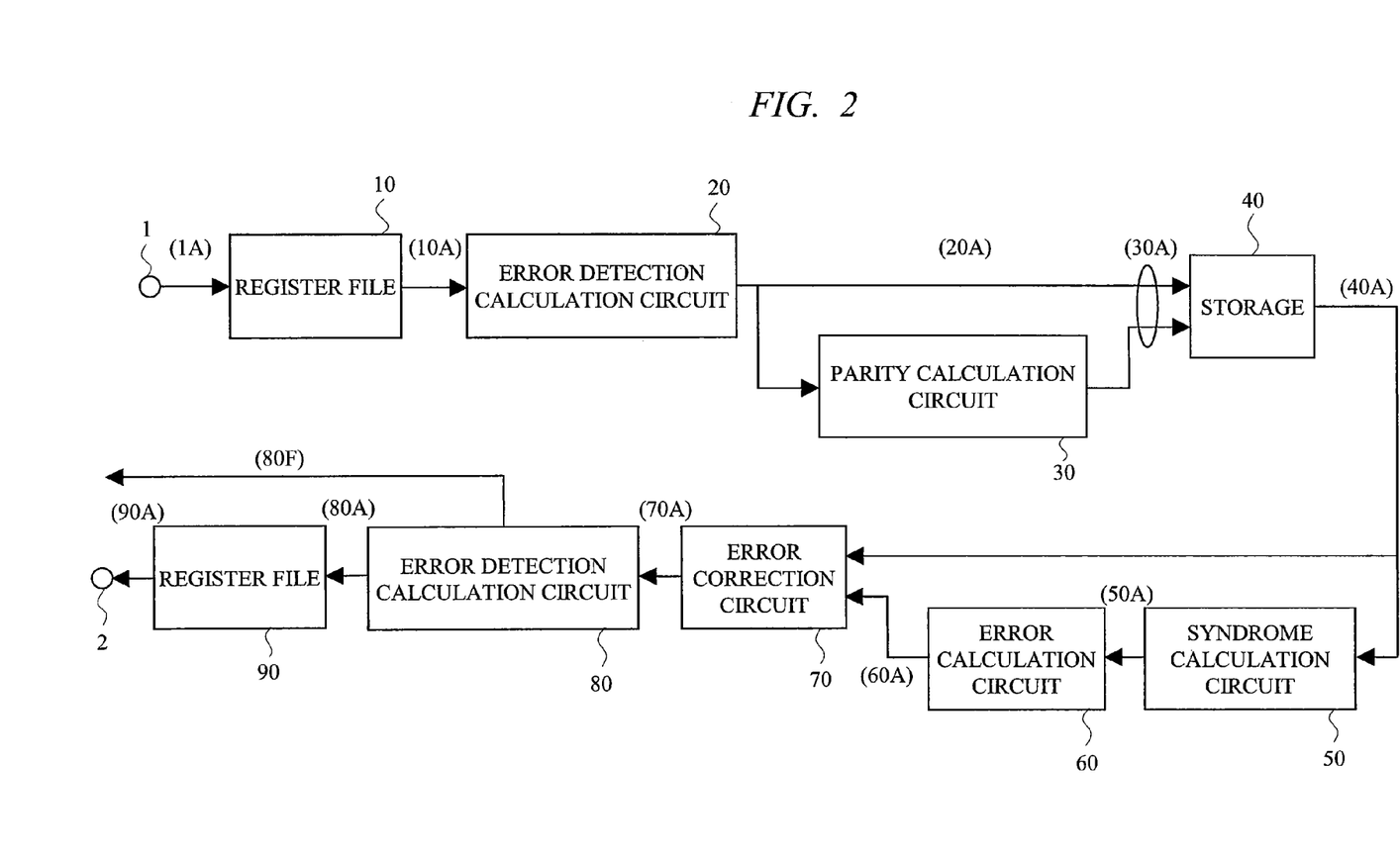
FIG. 2 is a block diagram showing a configuration of the error detection and correction circuit according to an embodiment of the present invention.

Next, an example of a configuration of the error detection and correction circuit according to the present embodiment will be described with reference to FIG. 2. FIG. 2 is a block diagram showing a configuration of the error detection and correction circuit according to an embodiment of the present invention.

The error detection and correction circuit according to the present embodiment is composed of a register file 10 that divides input data (1A) into symbols in units of b bits (b is an integer of 5 to 7), an error detection calculation circuit 20 (second encoding means) that adds a check bit for detecting an error, a parity calculation circuit 30 (first encoding means) that adds an error detecting and correcting code of a symbol unit, a syndrome calculation circuit 50, an error calculation circuit 60, an error correction circuit 70 that performs error detection and correction for reproduced data in units of symbols, an error detection calculation circuit 80 that checks the presence of an error in the corrected data, a register file 90 and others, and the error detection and correction circuit configures a recording/reproducing device, a semiconductor memory or others together with a storage 40.

For example, the storage 40 is a semiconductor storage such as DRAM, SRAM, flash memory, EEPROM or EPROM or a magnetic memory. Also, a memory cell in the storage 40 is not limited to a binary memory cell and may be that utilizing a multivalued technology.

Figure 3:
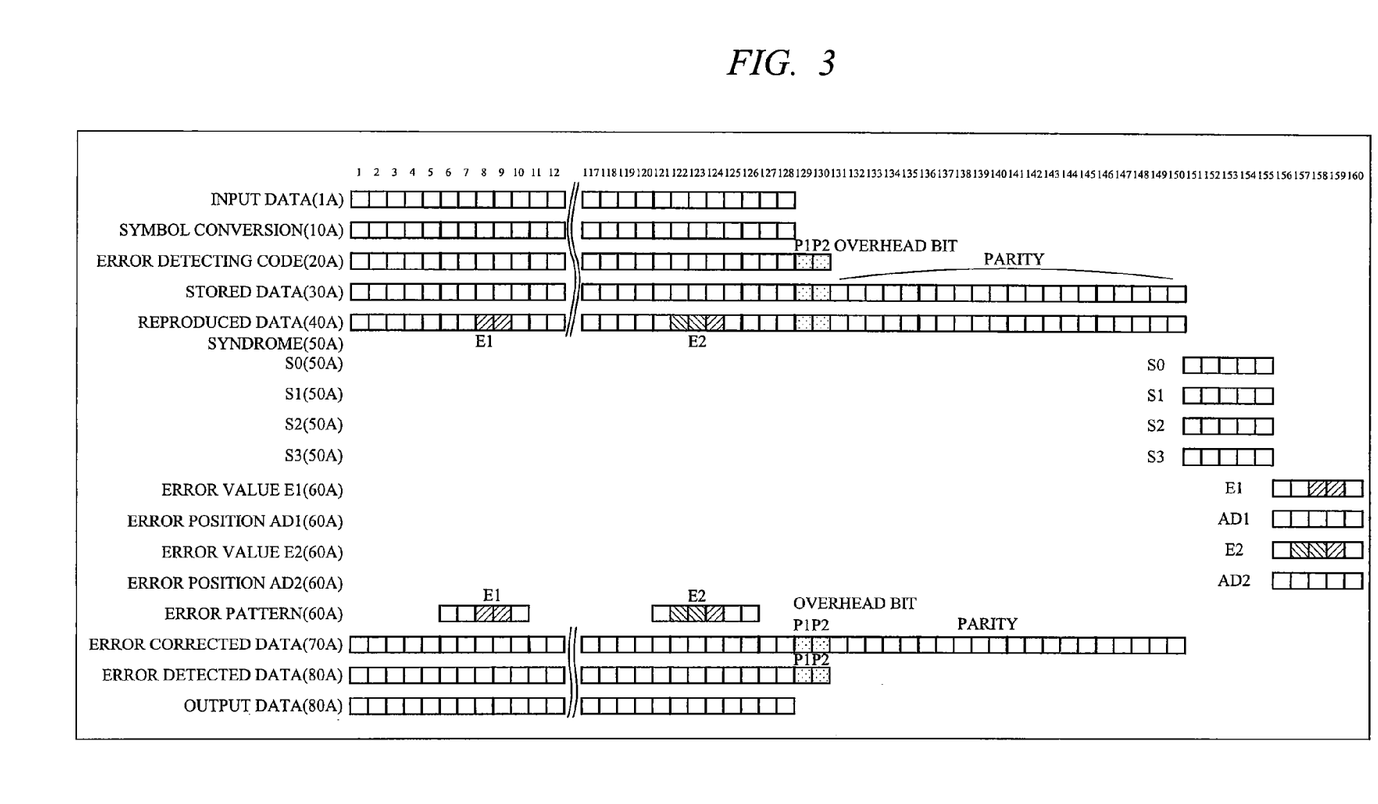
FIG. 3 is a diagram showing a flow of data in the error detection and correction circuit according to an embodiment of the present invention (case of b=5)

Next, an operation of the error detection and correction circuit according to the present embodiment will be described with reference to FIG. 2 and FIG. 3. FIG. 3 is a diagram showing a flow of data in the error detection and correction circuit according to an embodiment of the invention. In FIG. 3, the horizontal axis may be regarded as a time axis but is regarded as an axis representing the data width on which calculations are performed in parallel when high speed is required.

The input data (1A) having an integral multiple of 8 bits, which is input to an input terminal 1, is converted (divided) into data (symbols) (10A) having a constant bit width in the register file 10. In this example, 16 bytes or 128 bits are set to one encoding block, and one symbol is converted into 5 bits (b=5) in this case. The data width and the number of added bits in one symbol (b) are as described in FIG. 1.

The data (10A) is input to the error detection calculation circuit 20, and simple parities P1 and P2 of 2 bits are calculated from (Equation 2) and (Equation 3) and added to the data (20A). The data (20A) is input to the parity calculation circuit 30 and the storage 40. In the parity calculation circuit 30, a parity (4 symbols) having a 2-symbol error correction capability is calculated and is output to the storage 40 as stored data (30A) together with the data portion (20A).

Next, the data (40A) reproduced from the storage 40 is input to the syndrome calculation circuit 50 and the error correction circuit 70. In the syndrome calculation circuit 50, four syndromes S0, S1, S2 and S3 are calculated (50A) by a check matrix for the error correcting code data (40A), and the result thereof is output to the error calculation circuit 60. When two errors occur, the positions AD1 and AD2 where the errors have occurred and the magnitudes of the errors E1 and E2 are calculated by using the four syndromes S0, S1, S2 and S3 in the error calculation circuit 60 (60A). The data is output to the error correction circuit 70 to correct two or fewer errors included in the reproduced data (40A) (70A).

The data is input to the error detection calculation circuit 80 to check whether or not an error has occurred in the data (70A) after the error correction from the 2-bit simple parities P1 (Equation 2) and P2 (Equation 3) (80A). If an error is detected, it is determined that erroneous correction or error detection failure has occurred, and a flag (80F) is output to the system. The output of the error detection calculation circuit 80 (80A) is output to the register file 90, and the original recorded data (90A) in units of 8 bits is recovered and output to an output terminal 2.

Figure 4:
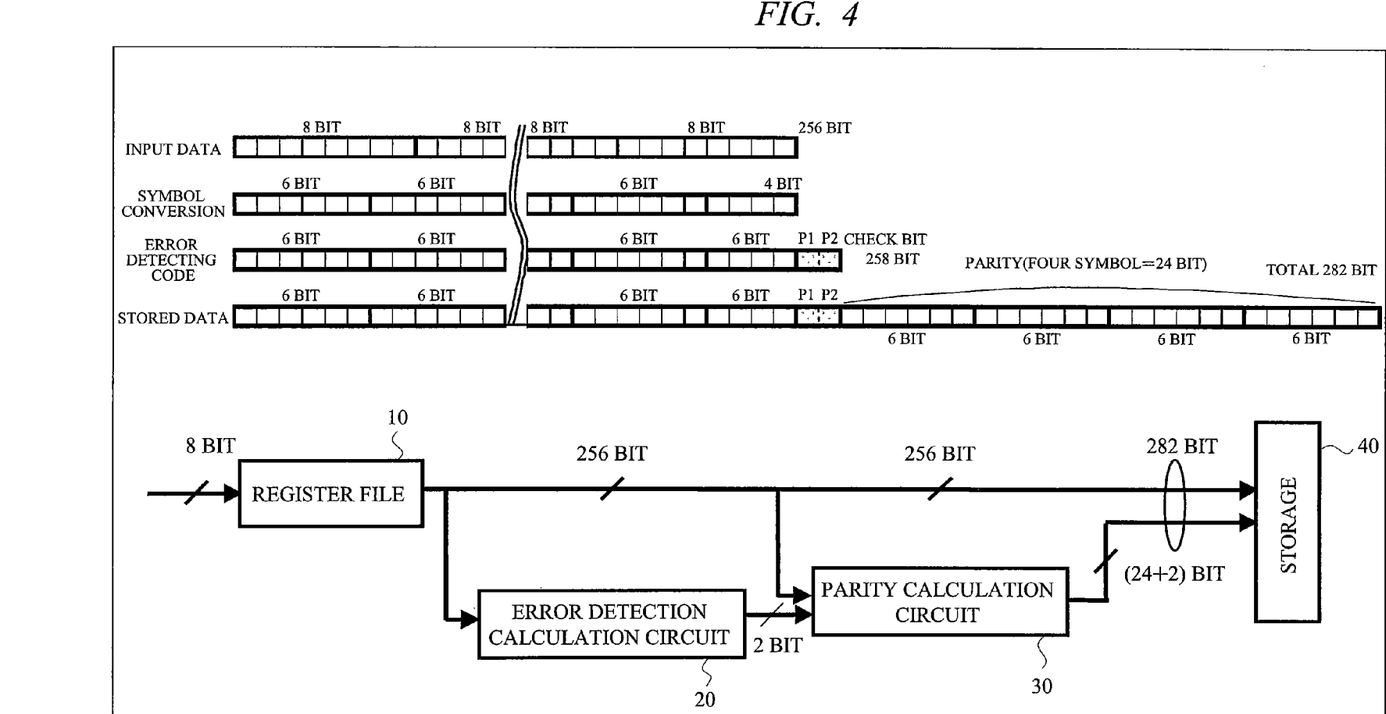
FIG. 4 is a diagram showing a flow of data in the error detection and correction circuit according to an embodiment of the present invention (case of b=6)

When 32 bytes or 256 bits are set to one encoding block, one symbol is set to have 6 bits (b=6) to be processed. FIG. 4 shows a flow of data when one symbol has 6 bits (b=6).

Similarly, when 64 bytes or 512 bits are set to one encoding block, one symbol is set to have 7 bits (b=7) to be processed. In this case, the overhead bit (check bit) has 6 bits.

Note that, in the error correction processing, there is a problem that when errors more than the correction capability occur, the erroneous correction occurs and errors are increased. The erroneous correction can be detected by the error detecting code according to the embodiment. However, when a further larger error occurs, the erroneous correction occurs and the erroneous correction cannot be detected by the error detecting code in some cases.

For its solution, another embodiment will be described below. In this method, whether the detected error is a random error or a burst error is estimated from the magnitude and position of the error, and the error correction processing is switched according to the result of estimation.

Figure 5:
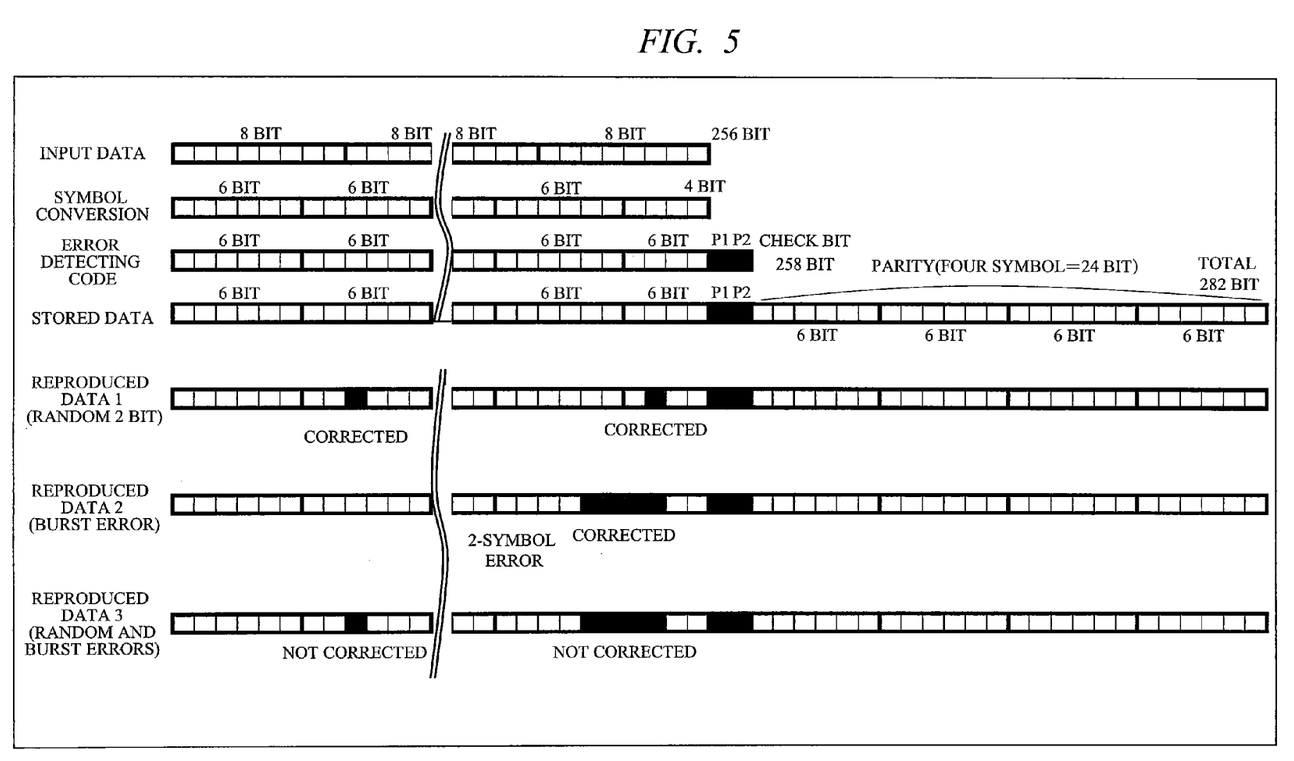
FIG. 5 is a diagram showing a flow of data in the error detection and correction circuit according to another embodiment of the present invention (case of b=6)

This embodiment will be described with reference to FIG. 5. FIG. 5 is a diagram showing a flow of data in the error detection and correction circuit according to another embodiment of the present invention (case of b=6). Although an example where 6 bits are set to one symbol to be processed will be shown here, the encoding is the same as that in the above-mentioned embodiment. An example where three types of errors occur at the reproduction will be shown. In this example, whether the detected error is a random error or burst error is estimated from the magnitude of the error, and then the correction processing is switched.

The reproduced data 1 shows the case where a 1-bit error occurs at two positions, and 2-symbol (independent 2 bits) error correction is performed in this case.

The reproduced data 2 shows the case where an error occurs in two symbols estimated to be at physically adjacent positions on the semiconductor chip (storage 40) (referred to as burst error), and the 2-symbol error correction is performed in this case.

When it is estimated that two burst errors other than those occur as in the reproduced data 3, since there is the possibility that another larger error has occurred, the error correction circuit 70 does not perform error correction. Instead, a flag as the error detection is output to commit the processing to a higher system. The higher system performs rereading (reproducing) or data discarding, for example. By this means, the possibility of erroneous correction can be significantly reduced.

Further, by performing erasing correction to the symbol which is determined to have a failure in advance, the performance of the error correction can be improved.

As described above, in the error detection and correction circuit and the semiconductor memory incorporating the same according to the embodiments, an error detecting code of a bit unit is added and an error detecting and correcting code having the error correction capability of two or more symbols is employed for a soft error that occurs in a storage such as a semiconductor memory, and thereby a storage system with high reliability can be provided.

In the foregoing, the invention made by the inventors of the present invention has been concretely described based on the embodiments. However, it is needless to say that the present invention is not limited to the foregoing embodiments and various modifications and alterations can be made within the scope of the present invention.

INDUSTRIAL APPLICABILITY

The present invention is applicable to a semiconductor memory, a recording/reproducing device and the like.

The invention claimed is:

1. An error detection and correction circuit which encodes input data having an integral multiple of 8 bits and stores the encoded data in a storage, and decodes original information from a reproduction signal of the storage, comprising:
    means for dividing the input data into symbols in units of b bits where b is an integer of 5 to 7;
    first encoding means for adding an error detecting and correcting code of a symbol unit to the data divided into symbols;
    second encoding means for adding a number of check bits for detecting an error based on a difference between the data divided into symbols configured of a multiple of b bits and the input data having the integral multiple of 8 bits;
    means for recording the data added with the error detecting and correcting code in the storage;
    decoding means for performing error detection and correction in units of symbols to data of the reproduction signal read from the storage, by using the error detecting and correcting code; and
    checking means for checking presence of an error in the data corrected in the decoding means, by using the check bits.

2. The error detection and correction circuit according to claim 1,
    wherein the first encoding means adds an error detecting and correcting code having an error correction capability of at least two symbols.

3. The error detection and correction circuit according to claim 1,
    wherein the decoding means performs 2-symbol error correction only when it is determined that a 1-bit error at an independent symbol position occurs at two positions.

4. The error detection and correction circuit according to claim 1,
    wherein the decoding means performs 2-symbol error correction only when it is determined that an error occurs in two symbols which are estimated to be at physically adjacent positions on the storage.

5. The error detection and correction circuit according to claim 1,
    wherein erasure correction is performed to a symbol which is determined to have a failure in advance.

6. The error detection and correction circuit according to claim 1,
    wherein the second encoding means adds a 2-bit check bit to 128 bits of the input data,
    the first encoding means adds an error detecting and correcting code whose one symbol is 5 bits to the data added with the check bit, and
    the decoding means performs error detection and correction whose one symbol is 5 bits to data of a reproduction signal from the storage.

7. The error detection and correction circuit according to claim 1,
    wherein the second encoding means adds a 2-bit check bit to 256 bits of the input data,
    the first encoding means adds an error detecting and correcting code whose one symbol is 6 bits to the data added with the check bit, and
    the decoding means performs error detection and correction whose one symbol is 6 bits to data of a reproduction signal from the storage.

8. The error detection and correction circuit according to claim 1,
    wherein the second encoding means adds a 6-bit check bit to 512 bits of the input data,
    the first encoding means adds an error detecting and correcting code whose one symbol is 7 bits to the data added with the check bit, and
    the decoding means performs error detection and correction whose one symbol is 7 bits to data of a reproduction signal from the storage.

9. A semiconductor memory having a storage configured of a highly-integrated semiconductor integrated circuit and an error detection and correction circuit incorporated therein,
    wherein the semiconductor memory is configured to record input data having an integral multiple of 8 bits and comprises:
    means for dividing the input data into symbols in units of b bits where b is an integer of 5 to 7;
    encoding means for adding an error detecting and correcting code having an error correction capability of at least two symbols to the data divided into symbols;
    means for recording data added with the error detecting and correcting code in the storage;
    a storage for storing the data to which the error detecting and correcting code is added in the encoding means; and
    decoding means for performing error detection and correction in units of symbols to data of a reproduction signal read from the storage, and
    the input data is encoded and recorded in the storage and original information is decoded from the reproduction signal of the storage.

10. The semiconductor memory according to claim 9,
    wherein, when 128 bits are set to one encoding block, it is divided into symbols in units of 5 bits, when 256 bits are set to one encoding block, it is divided into symbols in units of 6 bits, and when 512 bits are set to one encoding block, it is divided into symbols in units of 7 bits.

11. A semiconductor memory having a storage configured of a highly-integrated semiconductor integrated circuit and an error detection and correction circuit incorporated therein,
    wherein the semiconductor memory is configured to record input data having an integral multiple of 8 bits and comprises:
    means for dividing the input data into symbols in units of 5 bits when an encoding unit block is 128 bits, dividing the input data into symbols in units of 6 bits when the encoding unit block is 256 bits, and dividing the input data into symbols in units of 7 bits when the encoding unit block is 512 bits;
    encoding means for adding an error detecting and correcting code of a symbol unit to the data divided into symbols;
    means for recording data added with the error detecting and correcting code in the storage;
    a storage for storing the data to which the error detecting and correcting code is added in the encoding means; and
    decoding means for performing error detection and correction in units of symbols to data of a reproduction signal read from the storage.

12. The semiconductor memory according to claim 9,
    wherein a number of bits are added to a number of extra bits occurring in the symbol division to provide the number of symbol division unit bits, and the error correcting code is assigned thereto.

13. A semiconductor memory having a storage configured of a highly-integrated semiconductor integrated circuit and an error detection and correction circuit incorporated therein, wherein the semiconductor memory is configured to record input data having an integral multiple of 8 bits and comprises:

means for dividing the input data into symbols in units of b bits where b is an integer of 5 to 7;

encoding means for adding a bit to an extra bit occurring in the division into symbols to provide a b-bit configuration, and further adding bits in units of b bits as needed to assign an error detecting and correcting code to the bits;

means for recording data added with the error detecting and correcting code in the storage;

a storage for storing the data to which the error detecting and correcting code is added in the encoding means; and decoding means for performing error detection and correction in units of symbols to data of a reproduction signal read from the storage.

* * * * *